US010436301B2

(12) United States Patent
Sørensen

(10) Patent No.: US 10,436,301 B2
(45) Date of Patent: Oct. 8, 2019

(54) LINEAR ACTUATOR

(71) Applicant: LINAK A/S, Nordborg (DK)

(72) Inventor: Rene Sørensen, Gråsten (DK)

(73) Assignee: LINAK A/S, Nordborg (DK)

( * ) Notice: Subject to any disclaimer, the term of this patent is extended or adjusted under 35 U.S.C. 154(b) by 188 days.

(21) Appl. No.: 15/329,336

(22) PCT Filed: Jul. 29, 2015

(86) PCT No.: PCT/DK2015/000030
§ 371 (c)(1),
(2) Date: Jan. 26, 2017

(87) PCT Pub. No.: WO2016/015730
PCT Pub. Date: Feb. 4, 2016

(65) Prior Publication Data
US 2017/0219072 A1 Aug. 3, 2017

(30) Foreign Application Priority Data
Jul. 29, 2014 (DK) .................................. 2014 00423

(51) Int. Cl.
*H02K 7/06* (2006.01)
*F16H 25/24* (2006.01)
(Continued)

(52) U.S. Cl.
CPC ......... *F16H 25/2454* (2013.01); *F16H 25/20* (2013.01); *H02K 7/102* (2013.01);
(Continued)

(58) Field of Classification Search
CPC .......... H02K 7/06; H02K 7/1166; H02K 7/10; H02K 7/102
See application file for complete search history.

(56) References Cited

U.S. PATENT DOCUMENTS 3,682,283 A * 8/1972 Sato ...................... B23Q 11/04
                                                          192/141
8,091,444 B2 * 1/2012 Tseng .................. F16H 25/2454
                                                          188/180
(Continued)

FOREIGN PATENT DOCUMENTS

DE         295 22 239 U1    12/2000
DE     10 2005 007205 B3     8/2006

OTHER PUBLICATIONS

International Search Report for corresponding patent application No. PCT/DK2015/000030 dated Feb. 3, 2016.

*Primary Examiner* — Dang D Le
(74) *Attorney, Agent, or Firm* — Renner Otto Boisselle and Sklar LLP

(57) ABSTRACT

A linear actuator includes an electric motor, which through a transmission drives a spindle unit having a spindle with a spindle nut. A tubular adjustment element is displaced either outwards or inwards depending on the direction of rotation of the spindle unit. A brake in the shape of a coil spring and a cylindrical element are arranged for retaining the tubular adjustment element in a given position when the power for the electric motor is cut off. The cylindrical element is configured as a separate cylindrical element arranged on the spindle or a shaft in the transmission. The separate cylindrical element is preferably arranged on a rear end of the spindle between the rear mounting and the bearing for the spindle. In contrast to known constructions, the heat generation is limited, as the heat is led out to the rear mounting.

3 Claims, 2 Drawing Sheets

Figure 3:
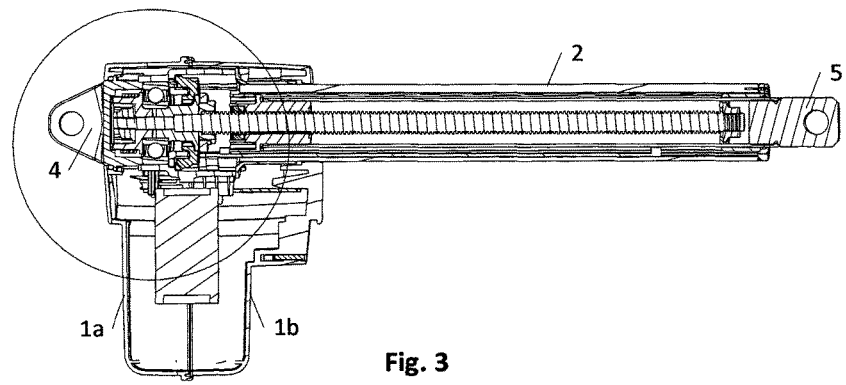

(51) Int. Cl.
  *F16H 25/20* (2006.01)
  *H02K 7/102* (2006.01)
  *H02K 7/116* (2006.01)
  *H02K 7/14* (2006.01)

(52) U.S. Cl.
  CPC ............ *H02K 7/1166* (2013.01); *H02K 7/14* (2013.01); *F16H 2025/209* (2013.01); *F16H 2025/2463* (2013.01)

(56) References Cited

U.S. PATENT DOCUMENTS

2012/0227522 A1 9/2012 Wu
2013/0169088 A1 7/2013 Wu

* cited by examiner

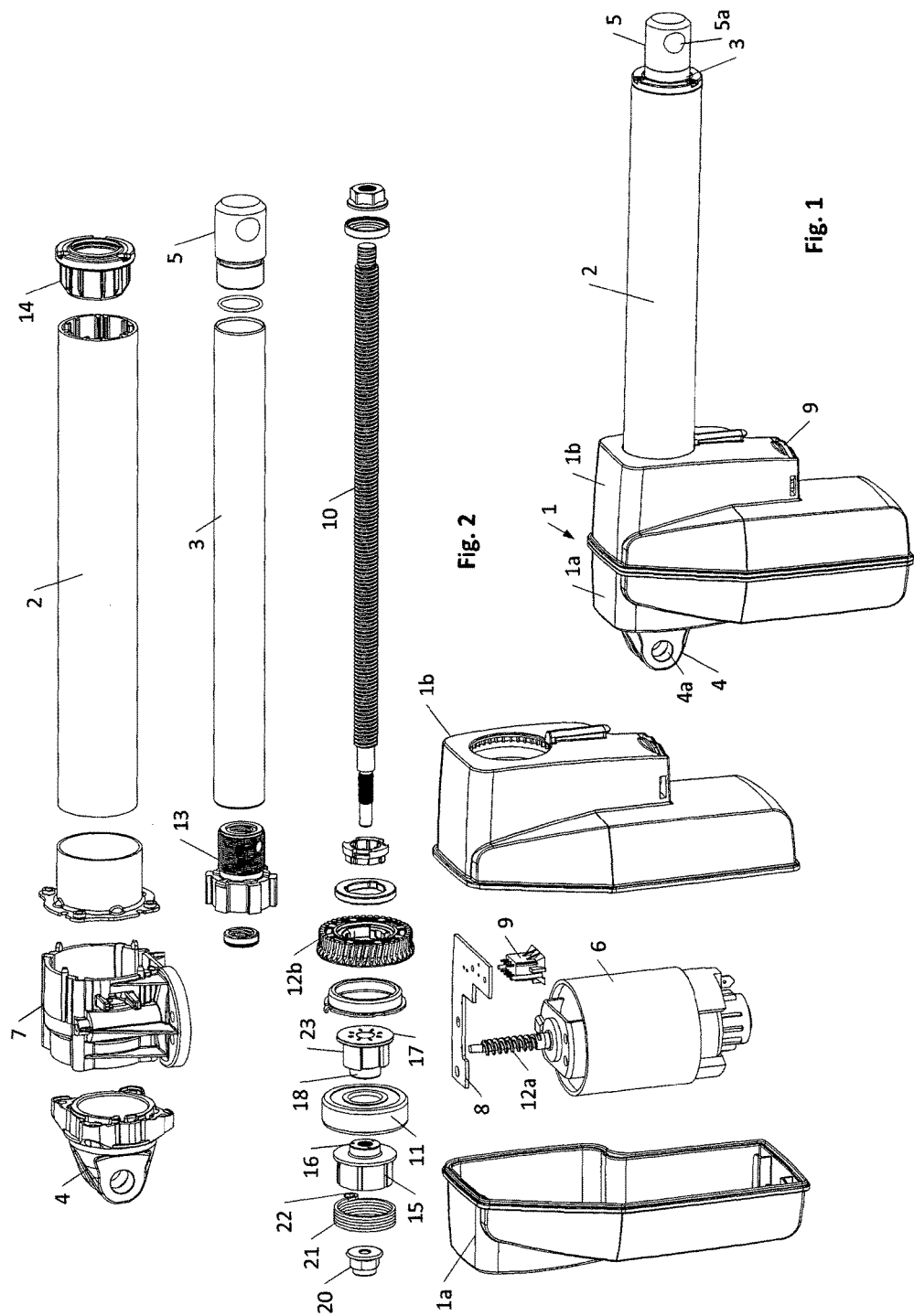

LINEAR ACTUATOR

This application is a national phase of International Application No. PCT/DK2015/000030 filed Jul. 29, 2015 and published in the English language, which claims priority to Denmark Application No. PA 2014 00423 filed Jul. 29, 2014, which is hereby incorporated herein by reference in its entirety.

The invention relates to a linear actuator comprising an electric motor with a motor shaft, a transmission with an input and an output, where the input is in connection with the motor shaft, a spindle unit in connection with the output of the transmission, where the spindle unit comprises at least one spindle with a spindle nut, an adjustment element in connection with the spindle unit, a brake comprising a coil spring in connection with a cylindrical element for retaining the adjustment element in the given position it has reached, when the power for the electric motor is cut off.

Linear actuators should in general be self-locking in order for the activation element also when under the maximum load to remain in the desired position when the power for the electric motor is cut off. In that respect the linear actuators can generally be divided into those equipped with a self-locking spindle and those equipped with a non-self-locking spindle. Whether or not a spindle is self-locking depends as a rule on the thread pitch. If the thread pitch is lower than the friction coefficient the spindle is self-locking and if the thread pitch is larger the spindle is non-self-locking. The friction is however not unambiguous and depends on different conditions such as material, the working of the material, lubrication, temperature and dynamic influences such as vibrations. Further, there is a difference between the static and the dynamic friction, where the static friction is larger than the dynamic friction.

There are many reasons why non-self-locking spindles are preferred over self-locking spindles. One of the reasons is that the non-self-locking spindles have a higher efficiency than self-locking spindles, which means that they are less energy intensive to drive than the self-locking spindles. Another reason is that the non-self-locking spindles due to the larger thread pitch are quicker to perform the adjustment than the self-locking spindles. On the other hand it should be taken into consideration that the linear actuator in general should be self-locking, such that the activation element remains in the position, it has reached when the power for the motor is cut off. This results therein that a spindle having a thread pitch on the verge of self-locking is usually chosen.

In actuators with unambiguously non-self-locking spindles, such as ballscrews, a "parking brake" is used, which prevents the spindle from rotating when the power for the electric motor is cut off and thus retains the activation element in the position it had reached, when the power for the motor was cut off. The "parking brake" can e.g. be a solenoid brake or a cylindrical spring, where the ends of the spring are activated. The solenoid brake comprises a brake disc operated by an electromagnet. By the "parking brake" with the cylindrical spring this presses with the outer side against a surrounding wall and in the hollow of the spring there is a claw clutch, where the two folded ends of the spring are in engagement with a part of the claw clutch each. When the motor is initiated the claw clutch pulls in one or the other end of the spring and tightens this such that the diameter of the spring is reduced, by which the spring is released from its engagement with the surrounding wall. Here, the spring functions as a clutch spring and for that matter does not exert an actual brake function. Such a "parking brake" is e.g. described in WO 2005/079134 A2 to LINAK A/S. These brakes are very effective but fairly expensive and take up relatively much space resulting in a larger installation length of the actuator. A different type of brake, which is not only a parking brake and which is typically used where the spindle is on the verge of being self-locking comprises two cylindrical elements interconnected with a cylindrical spring. Between the two cylindrical elements is a needle bearing and between the free end of one of the two cylindrical elements and a fixed part there is a friction disc. In one direction of rotation of the spindle the two cylindrical elements are mutually disengaged and the spindle can rotate freely. In the other direction of rotation the two cylindrical elements are interconnected, by which the friction disc is activated for braking of the spindle. The spring here also functions as a clutch spring as it engages and disengages the two cylindrical elements, respectively. Such a brake is e.g. described in U.S. Pat. No. 5,910,692 B1 to Tsubakimoto Chain Co. It is noted that this type of brake originally was developed and launched by Warner Electric Inc., USA. This brake construction is for that matter fine, but consists of relatively many parts, is relatively expensive and takes up a lot of space. A different and simpler brake is known, which simply comprises a cylindrical spring arranged around a cylindrical element on the end of the spindle or a gearwheel in the transmission. In one direction of rotation of the spindle the spring loosens itself from the cylindrical element and the spindle can rotate freely. This is owing to the fact that the spring with its angular direction is arranged such that it is affected to attempt to wind itself off the cylindrical element, by which the diameter of the spring is increased. In the other direction of rotation of the spindle the spring tightens itself around the cylindrical element and exerts a braking force thus keeping the spindle steady, when the power for the motor is cut off. The braking force is adjusted, such that this can be overcome by the motor when the activation element is reversed towards the initial position. The brake thus actively takes part in halting the spindle when the power for the motor is cut off, just as the brake is active when the activation element is reversed towards the initial position, i.e. the brake dampens the return speed of the activation element. Unlike the previously mentioned brakes the spring here functions as an actual brake, i.e. the spring itself exerts the braking force. This brake is developed and launched by LINAK A/S and described in EP 0 662 573 B1 to LINAK A/S. This brake has found common use as it is effective and very inexpensive. The braking force can, however, be difficult to determine as the friction is not unambiguous, but among other things depends on lubrication and temperature. Further, the spring is traditionally placed on a cylindrical projecting edge on a worm wheel of plastic, and the spring can here have a tendency to cut into the plastic which again makes it difficult to determine the braking force. When the actuator is being operated heat is generated in the worm gear and during braking until stopped and during the return movement, friction heat is further generated between the spring and the cylindrical element on the side of the worm wheel. This heat generation negatively affects the dimensional stability of the worm wheel, by which the spring over time easier can cut into the cylindrical element. A solution to this problem is among other things sought by placing a metal bushing around the cylindrical element on the worm wheel such that the spring functions on the metal bushing and is not in direct contact with the worm wheel. This, however, does not solve the problem with heating of the worm wheel and moreover noise is generated when the bushing during its rotation rubs against the spring.

The purpose of the invention is to provide a solution, where the heat impact on the worm wheel is reduced and can in a relatively simple manner be repaired in case the damage has already been done.

This is achieved according to the invention by designing the linear actuator as stated in claim 1, where the spring is located on a separate cylindrical element arranged on the spindle or a shaft in the transmission. As the cylindrical element is a separate element independent of gearwheels, such as worm wheel and possibly also plastic bushings, this element is only exposed to the friction heat created during braking until stopped and during the return movement, just as the heat impact on the worm wheel is limited to the heat generation occurring when the worm and the worm wheel are driven. In case the cylindrical element is damaged it can also be replaced without replacing the worm wheel. In an embodiment the separate cylindrical element is arranged on a rear end of the spindle, preferably between the rear mounting and the bearing for the spindle. The friction heat from the spring can thus be led out to the rear mounting and thus a cooling of the cylindrical element and the spring on this occurs.

A linear actuator according to the invention will be described more fully below with reference to the accompanying drawing. The drawing shows:

FIG. 1, a perspective view of a linear actuator seen from the front,

FIG. 2, an exploded view of the linear actuator,

FIG. 3, a longitudinal section through the linear actuator, and

Figure 4:
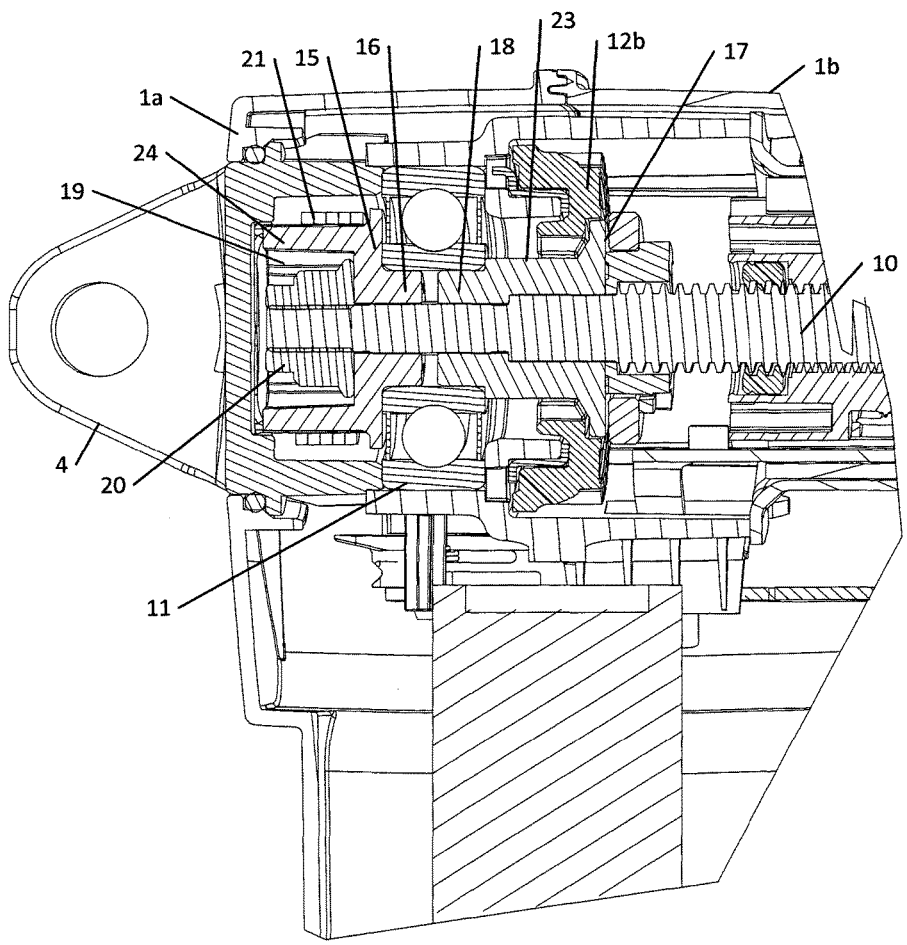

FIG. 4, a detailed section of the longitudinal section in FIG. 3.

The linear actuator outlined in the drawing comprises a housing 1 consisting of a first portion 1a and a second portion 1b. Further, the linear actuator comprises a guide tube 2 and a tubular adjustment element 3 guided in this. For mounting the actuator a rear end of the housing 1 is equipped with a rear mounting 4 and in a front end of the tubular adjustment element 3 there is a front mounting 5. Both the rear mounting as well as the front mounting has an eye, a through-going hole 4a,5a for a bolt, rivet, axle pin or the like, by means of which the linear actuator can be secured. As it appears from FIG. 2, the linear actuator further comprises an electric motor 6, typically a reversible electric motor, which can be either a DC or AC motor for low voltage or mains voltage. To a front end of the electric motor 6 a chassis 7 in the shape of a housing is mounted, which together with the electric motor 6 constitutes the main components of the linear actuator. The rear mounting 4 is mounted on a rear end of the chassis 7 while the guide tube 2 with a rear end is mounted to a front end of the chassis 7. In connection with the electric motor 6 there is a printed circuit board 8 with a plug 9 for connecting the linear actuator to a power supply and possibly also to an electric controller.

The linear actuator further comprises a spindle 10, where a bearing 11 is mounted on a rearmost part thereof, by which the spindle is embedded and mounted in the chassis 7. The spindle 10 is driven by the electric motor 6 through a transmission 12, here a worm gear, where an extension of the shaft of the electric motor 6 is designed as a worm 12a in engagement with a worm wheel 12b, mounted on the spindle 10.

The spindle 10 has external threads, where a spindle nut 13, which is secured against rotation, having internal threads is in engagement with the threads of the spindle 10. A rear most part of the spindle nut 13 is equipped with fins, which axially extends into tracks running internally in the guide tube 2 and thus both secures the spindle nut 13 against rotation and guides the spindle nut 13 in the guide tube 2. A front most part of the spindle nut is provided with external threads for mounting of the tubular activation element 3, which in a rearmost end is provided with corresponding internal threads, such that the activation element can be screwed onto the spindle nut 13. In the front end of the guide tube 2 there is a guide bushing 14 as guide for the tubular adjustment element 3. The guide bushing 14 can be equipped with a seal to prevent ingress of dust and moisture between the guide bushing 4 and the tubular adjustment element 3. The seal can be an O-ring, lip seal or the like.

On a rearmost end of the spindle 10 there is a cylindrical element 15 in the shape of a bushing, which is mounted in a manner secured against rotation. On a front end of the cylindrical element 15 there is a cylindrical bearing surface 16 and on a rear end of an adjacent bushing 17 there is a corresponding cylindrical bearing surface 18. The bearing 11 for the spindle 10 is mounted between the cylindrical element 15 and the bushing 17 on these bearing surfaces 16,18. It is noted that the worm wheel 12b is embedded on a different bearing surface 23 in the bushing 17. The cylindrical element 15 has in a rearmost end a recess 19 for a nut 20, for fastening the element 15 to the spindle 10. On its rearmost end the cylindrical element 15 has a cylindrical braking surface 24 for a spring 21, the one end 22 of which is bent radially out and retained in a recess in the rear mounting 4. At a standstill the spring 21 exerts a blocking momentum on the cylindrical element and thus on the spindle 10 such that the tubular adjustment element 3 remains in the position it has reached when the power for the electric motor is cut off.

The spring 21 is with its windings arranges such that it loosens its grip on the cylindrical element 15 when the tubular adjustment element 3 is displaced outwards, i.e. lifts a load. When the tubular adjustment element 3 is retracted the spring 21 tightens around the cylindrical element 15 and exerts a braking momentum on the element 15. The braking momentum is, however, not so large that it cannot be overcome by the electric motor 6, which after all is dimensioned to at least being able to lift the maximum load, for which the linear actuator is intended. During normal use the linear actuator will be loaded and this load will contribute to overcoming the brake momentum of the spring. As the spring 21 is placed on a separate element, namely the cylindrical element 15, this is only subjected to heat generation from the spring 21. The heat generation is even limited to the heat generation occurring when the tubular adjustment element 3 is retracted. When the cylindrical element 15 is placed on the spindle 10 and between the bearing 11 and the rear mounting 4, which are both made from metal, these will divert the heat from the spring 21 and the element 15. Should the cylindrical element 15 or the spring 21 for that matter be damaged, this can relatively easy be repaired, as the spring 21 and the cylindrical element 15 are relatively easy to access.

The invention claimed is:

1. A linear actuator comprising an electric motor with a motor shaft, a transmission in connection with the motor shaft, a spindle unit in connection with the transmission, where the spindle unit comprises at least one spindle with a spindle nut, and where the spindle is equipped with a bearing, an adjustment element in connection with the spindle unit, a brake in the shape of a coil spring arranged in connection with a cylindrical element for retaining the adjustment element in a given position when the power for the electric motor is cut off, wherein the cylindrical element is configured as a separate cylindrical element arranged on the spindle, wherein the coil spring is configured to retract around the cylindrical element to exert a braking force on the cylindrical element in response to rotation of the cylindrical element in a first rotational direction, and wherein the coil spring is configured to expand in diameter relative to the cylindrical element in response to rotation of the cylindrical element in an opposite rotational direction.

2. The linear actuator of claim 1 wherein the separate cylindrical element is arranged on a rear end of the spindle.

3. The linear actuator of claim 2 further comprising a rear mounting, wherein the separate cylindrical element is arranged between the rear mounting and the bearing for the spindle.

\* \* \* \* \*